April 13, 1948.  H. J. YELKIN  2,439,501
MEANS FOR ASSEMBLING RESILIENT GROMMETS TO GEAR SHIFT SELECTOR ARMS
Filed Sept. 4, 1946
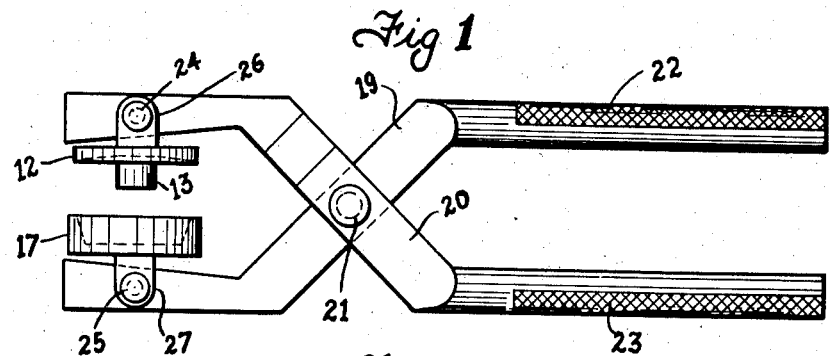
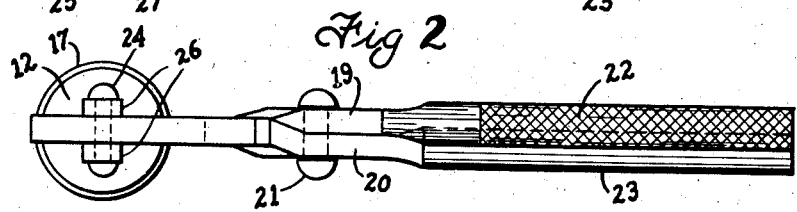
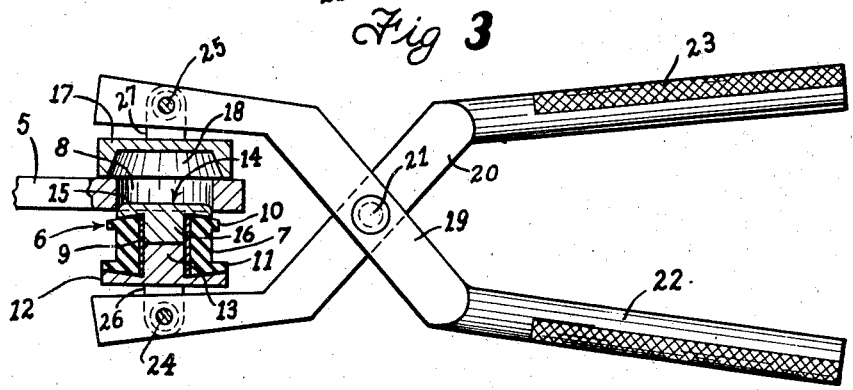
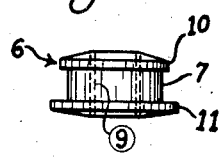
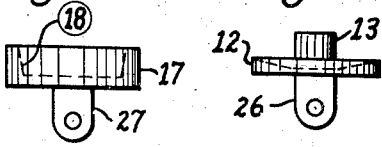
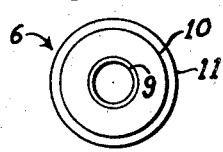
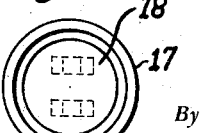
Inventor
Herman J. Yelkin
By Clarence A. O'Brien
and Harvey B. Jackson
Attorneys Patented Apr. 13, 1948

2,439,501

UNITED STATES PATENT OFFICE 2,439,501

MEANS FOR ASSEMBLING RESILIENT GROMMETS TO GEAR SHIFT SELECTOR ARMS

Herman J. Yelkin, Long Beach, Calif.

Application September 4, 1946, Serial No. 694,724

2 Claims. (Cl. 218—25)

This invention relates to a novel means for assembling resilient grommets to the gear shift selector arms of automobile transmission mechanisms.

Grommets of the above kind include a rubber collar adapted to fit snugly in an opening of the gear shift selector arm and lined with a metallic sleeve or tubular bushing and having external flanges of different diameters on the respective ends thereof, the flange of smaller diameter being of slightly greater diameter than that of the opening in the gear shift selector arm. The grommet cannot be installed or assembled to the gear shift selector arm without grinding away the flange of smaller diameter or injuring the metallic sleeve or tubular bushing with which the grommet collar is lined, unless a special tool is provided for the purpose.

The primary object of the present invention, therefore, is to provide a novel means for assembling a grommet of the above kind to a gear shift selector arm without the necessity of grinding away the grommet flange of smaller diameter and without injuring the metallic sleeve or tubular bushing with which the grommet collar is lined.

The exact nature of the present invention, as well as further objects and features thereof, will become apparent from the following description when considered in connection with the accompanying drawing, in which:

Figure 1 is a side elevational view of a hand tool which preferably forms part of the means forming part of the present invention.

Figure 2 is a top plan view thereof;

Figure 3 is a view, partly in side elevation and partly in section, illustrating the manner of using the present means, including the tool of Figures 1 and 2, for assembling the grommet to a gear shift selector arm.

Figure 4 is a side elevational view of the grommet.

Figure 5 is a top plan view of the grommet shown in Figure 4.

Figure 6 is a side elevational view of one of the presser members forming part of the tool shown in Figure 1.

Figure 7 is a top plan view of the presser member shown in Figure 6.

Figure 8 is a side elevational view of the other presser member forming part of the tool shown in Figure 1.

Figure 9 is a side elevational view of a guide member adapted for use with the tool of Figure 1 and forming part of the means constituting part of the present invention.

Referring in detail to the drawing, the present invention contemplates a means for assembling to a gear shift selector arm 5 a resilient grommet 6. The grommet 6 consists of a rubber collar 7 adapted to fit snugly in an opening 8 of the gear shift selector arm 5. The collar 7 is lined with a metallic sleeve or tubular bushing 9, and it has external flanges 10 and 11 of different diameters which are provided on the respective ends of the collar 7. The flange 10 is of slightly greater diameter than that of the opening 8 in the gear shift selector arm 5, and in order to assemble the grommet to the selector arm 5, it is necessary to force the flange 10 through the opening 8 of the arm 5. In view of the thickness and stiffness of the collar and its flanges, this is a difficult task without the aid of special means or tools. In the absence of such special means or tools, it has been the practice to grind away the flange 10 and to force the grommet into place by any means at hand, which means usually causes injury to the sleeve or tubular bushing 9 with which the collar 7 is lined. As a result of grinding away the flange 10 and injuring the sleeve or bushing 9, the grommet will not stay in place and annoying rattle results, thereby defeating the very purpose for which the grommet is intended. In any words, the grommet is primarily used as an anti-rattler when installed in the opening of the gear shift selector arm.

In accordance with the present invention, the grommet is placed upon a presser disk 12 which is preferably of a diameter equal to the diameter of the flange 11 of the grommet collar and which has a center pin 13 of a length substantially less than the length of the grommet, the center pin 13 being snugly received in the lower end of the bushing 9. A guide member 14 is then placed upon the grommet, which guide member consists of a disk 15 of slightly less diameter than that of the opening 8 in the selector arm 5 and which has a center pin 16 of a length substantially less than the length of the grommet, the ends of the center pins 13 and 16 contacting within the bushing 9 of the grommet. The selector arm 5 is then placed above the grommet as shown in Figure 3 with the disk 15 of the guide member entered within the opening of the selector arm so that the grommet is also centered with respect to the opening 8 of the arm 5. A second presser member or disk 17 is then placed on the selector arm 5, the presser member or disk 17 having a recess 18 of a size to receive the disk 15 of the guide member and the flange 10 of the grommet collar. The recess 18 of the presser member or disk 17 is axially aligned with the opening 8 of the selector arm 5, and then the presser members or disks 12 and 17 are forced together so as to press the flange 10 of the grommet collar upwardly through the opening 8 in the selector arm 5. By using the means described, this can be accomplished in a quick and easy manner without distorting or injuring the bushing or sleeve 9 and without previously reducing or grinding away the flange 10 of the grommet. As a result of this, the grommet is quickly assembled to the selector arm in its original condition so that it effectively serves its purpose as an anti-rattler.

As shown, the presser members or disks 12 and 17 preferably constitute the jaws of a tool of the plier type including crossed handles 19 and 20 pivoted together intermediate their ends and at their crossing points as at 21 and provided at corresponding ends with hand grips 22 and 23, the presser members 12 and 17 being pivoted to the other ends of the handles 19 and 20 as at 24 and 25. The presser members 12 and 17 are preferably provided with spaced ears 26 and 27 between which the ends of the handles are received and through which the pivot pins 24 and 25 are passed. Of course, the presser members 12 and 17 are located at the adjacent or inner sides of the associated ends of the handles 19 and 20, and these ends of the handles may be swung a sufficient distance apart to admit the grommet, the guide member and the selector arm as shown. The presser members are forced toward each other simply by pressing the hand grip portions 22 and 23 of the handles toward each other.

From the foregoing description, it is believed that the construction, operation and advantages of the present means will be clearly understood and appreciated. Minor changes are contemplated, such as fall within the scope of the invention as claimed.

What I claim is:

1. A means for assembling a resilient grommet collar to the gear shift selector arm of an automobile transmission mechanism, wherein the grommet comprises a rubber collar adapted to fit snugly in an opening of the gear shift selector arm, said collar being lined with a metallic tubular bushing and having external flanges of different diameters on the respective ends thereof, the flange of smaller diameter being of slightly greater diameter than that of the opening in the gear shift selector arm, comprising a presser disk having a center pin of a length substantially less than the length of the grommet and of a diameter to be snugly received in one end of the bushing of the grommet, a guide member consisting of a disk of slightly less diameter than that of the opening in the selector arm and having a center pin of a diameter to be snugly received in the other end of the bushing of the grommet and to contact the center pin of the first named presser disk within the bushing when the presser disk and the disk of the guide member are engaged with opposite sides of the grommet collar, a second presser member having a recess of a size to receive the disk of the guide member and the grommet flange of smaller diameter, and means for forcing the presser members together with the recess of the second named presser member axially aligned with the opening of the selector arm.

2. The construction defined in claim 1, in combination with a pair of crossed handles pivotally connected together and having said presser members pivoted to corresponding ends thereof.

HERMAN J. YELKIN.